United States Patent
Livoti

(10) Patent No.: US 7,542,261 B2
(45) Date of Patent: Jun. 2, 2009

(54) DEVICE FOR DRIVING AND ELECTROMAGNET, PARTICULARLY FOR OPERATING PUMPS

(75) Inventor: Stefano Livoti, Santa Rufina (IT)

(73) Assignee: SEKO S.p.A., Cittaducale (RI) (IT)

( * ) Notice: Subject to any disclaimer, the term of this patent is extended or adjusted under 35 U.S.C. 154(b) by 315 days.

(21) Appl. No.: 11/572,379

(22) PCT Filed: Jul. 20, 2005

(86) PCT No.: PCT/IT2005/000418

§ 371 (c)(1),
(2), (4) Date: Jan. 19, 2007

(87) PCT Pub. No.: WO2006/008777

PCT Pub. Date: Jan. 26, 2006

(65) Prior Publication Data

US 2008/0001560 A1    Jan. 3, 2008

(30) Foreign Application Priority Data

Jul. 21, 2004    (IT) .............................. RM04A0371

(51) Int. Cl.
*H01H 9/00* (2006.01)
(52) U.S. Cl. ...................................... 361/139; 361/160
(58) Field of Classification Search .................. 361/139, 361/143, 160; 417/44.1
See application file for complete search history.

(56) References Cited

U.S. PATENT DOCUMENTS

| 5,514,942 | A | 5/1996 | Albach |
| 6,457,944 | B1 | 10/2002 | Haberlander et al. |
| 6,898,984 | B2* | 5/2005 | Schob ...................... 73/861.08 |
| 2006/0045755 | A1* | 3/2006 | McDonald et al. ............ 417/50 |
| 2006/0073024 | A1* | 4/2006 | Ghoshal et al. ................ 417/50 |

FOREIGN PATENT DOCUMENTS

| GB | 424547 | 2/1935 |
| GB | 2281666 A | 3/1995 |
| IT | 1315957 | 12/2000 |
| WO | 95 01084 A1 | 1/1995 |

* cited by examiner

*Primary Examiner*—Danny Nguyen
(74) *Attorney, Agent, or Firm*—Stanislaus Aksman; Roberts Mlotkowski Safran & Cole, P.C.

(57) ABSTRACT

A device for driving an electromagnet, for operating pumps, including a primary winding and a moving element, power switching electronic means, a control logic unit to control the power switching electronic means and to detect a value of an excitation current. A power supply of the control logic unit provided by a corresponding shunt (PP) of the primary winding, the control logic unit controlling the power switching electronic means depending on the detected value of the excitation current to make the electromagnet operate as an auto-transformer for providing the power supply to the control logic unit and maintaining the function of attracting the moving element substantially unchanged. Further disclosed are the corresponding driven electromagnet and the related method for driving the electromagnet.

13 Claims, 2 Drawing Sheets

DEVICE FOR DRIVING AND ELECTROMAGNET, PARTICULARLY FOR OPERATING PUMPS

CROSS-REFERENCE TO RELATED APPLICATION

This application is a 371 of International Application No. PCT/IT2005/000418 filed Jul. 20, 2005, which claims priority from Italian patent application RM2004A000371, filed Jul. 21, 2004, the entire contents of which are incorporated herein by reference.

FIELD OF THE INVENTION

The present invention concerns a device for driving an electromagnet, particularly for operating pumps, such as for instance pumps for dosing liquids, that is capable to operate over a wide range of supply voltages and that allows, in a reliable and efficient way, to obtain from the electromagnet the supply energy necessary for the operation of the device control logic, and to carry out the maximum transformation of electrical energy into mechanical force.

The present invention further concerns the corresponding driven electromagnet and the related method of driving the electromagnet.

BACKGROUND

It is known that electromagnetic pumps are employed for adding liquids, such as detergents, sanitisers, and disinfectants, to aqueous solutions through a predeterminable dosage repeatable in time.

In particular, the liquid is dosed into the solution through the mechanical action of an interposition membrane, moved by the action of two opposed forces: a pushing force, obtained through the magnetic attraction exerted on a ferromagnetic piston by an electromagnet, suitably driven by an electronic control circuit; and a return force, obtained through the repulsive action of a spring coaxial with the piston that is loaded by the same piston during the pushing phase.

However, presently available control circuits present some drawbacks.

In fact, traditional circuits supplying the electromagnet directly from the energy source, not taking the wide input voltage range into account, introduce large efficiency losses causing: scaling up to larger size the electromagnet; higher power consumption; an increase of temperature due to Joule effect of the electromagnet, limiting the so-called "time to fault" of the electromagnet and adjacent electronic components; and, consequently, an increase of manufacturing and maintenance costs.

In order to obviate such drawbacks, some solutions comprise some supplying circuits, interposed between the energy source and the electromagnet, for regulating the input voltage.

However, such traditional solutions also suffer from drawbacks.

First of all, even these driving circuits have high manufacturing and maintenance costs.

Moreover, traditional driving circuits do not allow an accurate regulation of the excitation current, that is substantially equal to a reference value valid in steady state, i.e. with warm electromagnet having a high resistive value of the winding, which value is at the beginning of operation, i.e. with cold electromagnet having a low resistive value of the winding, a value larger than necessary. This causes efficiency losses and a consequent higher power consumption, also making the electromagnet subject to rapid temperature increases due to Joule effect, limiting the "time to fault" of the electromagnet.

Finally, traditional driving circuits do not allow a precise detection of the position of the piston within the electromagnet, of which only completely outward or completely inward limit positions are substantially assumed.

SUMMARY OF THE INVENTION

In this context, it is included the solution proposed according to the present invention, allowing all the aforementioned drawbacks to be solved.

It is therefore an object of the present invention to provide a circuit for driving an electromagnet apt to operate over a wide range of supply voltages.

It is still an object of the present invention to allow an accurate regulation of the excitation current of the electromagnet.

It is further an object of the present invention to allow, in a reliable and efficient way, to obtain from the electromagnet the supply energy necessary for the operation of the driving control logic.

It is always an object of the present invention to carry out, while driving the electromagnet, the maximum transformation of electrical energy into mechanical force.

It is therefore specific subject matter of the present invention a device for driving an electromagnet, particularly for operating pumps as defined by claims 1-11.

It is still subject matter of the present invention a driven electromagnet, particularly for operating pumps, as defined by claim 12.

It is further subject matter of the present invention a method for driving an electromagnet, particularly for operating pumps, as defined by claim 13.

BRIEF DESCRIPTION OF THE DRAWINGS

The present invention will now be described, by way of illustration and not by way of limitation, according to its preferred embodiments, by particularly referring to the Figures of the enclosed drawings, in which.

DETAILED DESCRIPTION

In the Figures, alike elements are indicated by same reference numbers.

Figure 1:
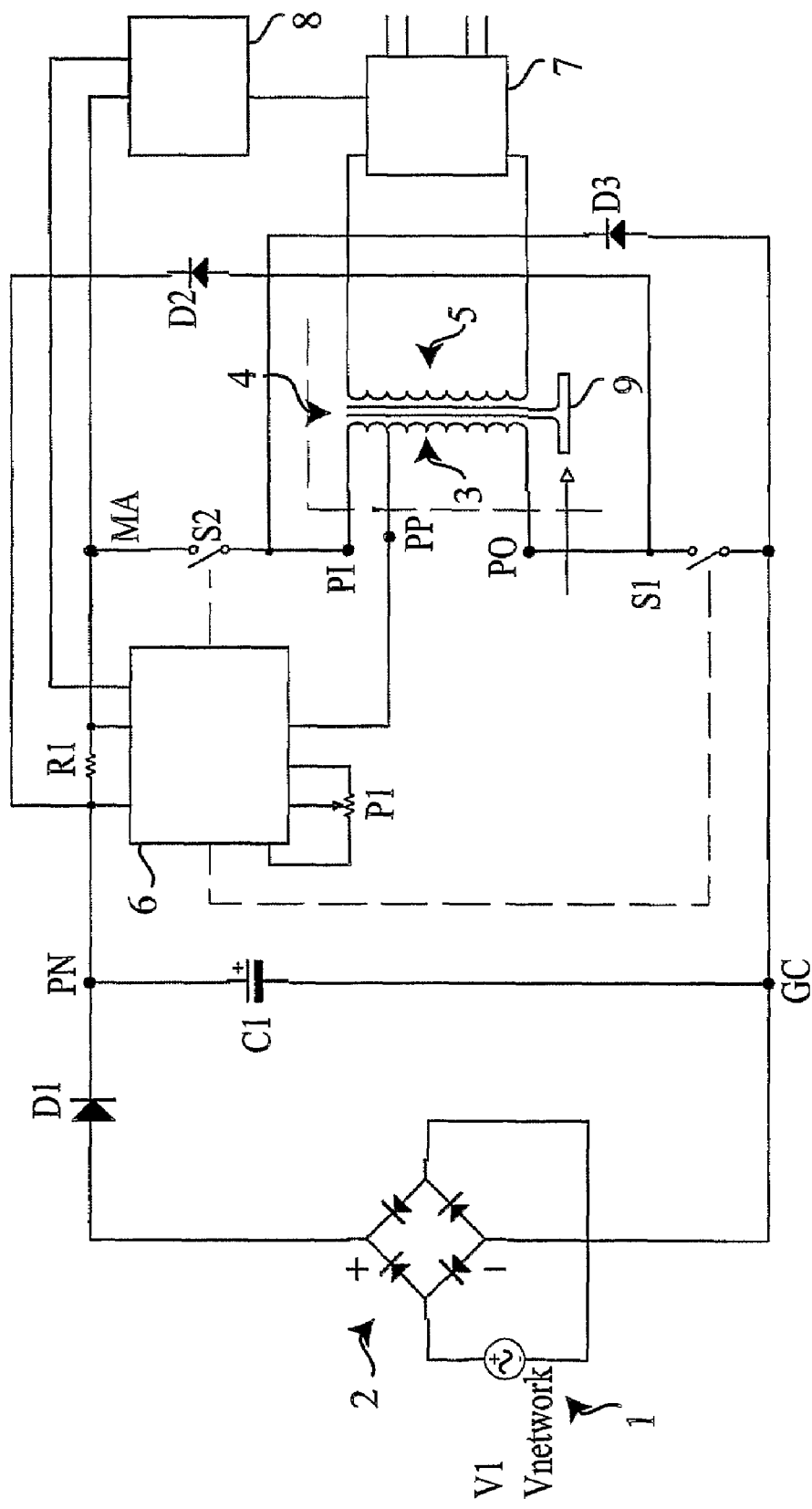
FIG. 1 shows a schematic circuit diagram of the driving device according to the invention.

FIG. 1 shows a schematic circuit diagram of the driving device according to the invention, wherein, in particular, power electronic switches are represented by simple on-off switches.

The device according to the invention is connected to the mains 1 through a rectifying bridge 2 and a block diode D1 (for preventing inverse currents from occurring), the output voltage of which is stabilised by the capacitor C1 and provided, after a resistor R1, on a power supply terminal MA.

A first power switch S1 is connected between the output terminal PO of a primary winding 3 of the electromagnet 4 and the circuit ground GC. A second power switch S2 is connected between the power supply terminal MA and the input terminal PI of the primary winding 3 of the electromagnet 4.

A second diode D2 is connected between the terminal PO and the positive node PN of the stabilising capacitor C1, before the resistor R1, with polarity such that it allows current to flow from the terminal PO to the positive node PN. A third diode D3 is connected between the circuit ground GC and the terminal PI, with polarity such that it allows current to flow from the circuit ground GC to the terminal PI. In particular, as it will be described below, the second and the third diodes D2 and D3 perform the same functions of the similar diodes of the control device that is subject matter of the Italian Patent No. IT1315957, herein incorporated by reference.

A first control logic unit 6, not galvanically insulated, controls the operation of power switches S1 and S2 and detects the power supply current flowing in the primary winding 3 of the electromagnet 4, through measuring the voltage on the resistor R1. Moreover, the first control logic unit 6 is connected to a regulation potentiometer P1, adjustable by an operator, apt, for instance, to regulate the number of shots per minute in the case when the operated pump is one of the so-called "constant pumps", i.e. to regulate the current in the primary winding 3 of the electromagnet 4 for modulating its force. The power supply necessary for the operation of the first control logic unit 6 is provided by a suitable shunt PP of the primary winding 3 of the electromagnet 4.

The device further comprises a second control logic unit 7, apt to communicate (in reception and/or in transmission) through digital and/or analog signals with external devices. In particular, the second control logic unit 7 is apt to further communicate with the first control logic unit 6 through a galvanic insulation unit 8; by way of example and not by way of limitation, the second control logic unit 7 may send to the first control logic unit 6 activation pulses in the case when the pump is a so-called "proportional" pump, and in this case the regulation potentiometer P1 may be apt to regulate the ratio between the number of input pulses received by the second control logic unit 7 and the effective number of shots of the same electromagnet 4 in case of the so-called "proportional" pumps. The power supply necessary for the operation of the second control logic unit 7 is provided by a suitable secondary winding 5 of the electromagnet 4.

As known, the electromagnet 4 is provided with a moving element 9 apt to be attracted within the same electromagnet by the current flowing in the primary winding 3.

In order to better understand the present invention, the operating modes of the preferred embodiment of the device will be described in the following, similar modes being valid for other embodiments.

Upon closing the mains switch (not shown), or upon applying the mains to the rectifying bridge 2, the two switches S1 and S2 are closed, providing the necessary power supply to the first control logic 6, while the current applied to the primary winding 3 of the electromagnet 4 gradually increases and is not yet sufficient to make the moving element 9 be attracted within the electromagnet.

The first control logic 6, during the "start-up" phase, measures, through the resistor R1, present supply voltage and/or current. When it detects the beginning of sufficient power supply conditions, it closes the two switches S1 and S2 at a predetermined (or variable) frequency with such an ON/OFF (i.e. closed/open) ratio to ensure the exact working current for the primary winding 3 of the electromagnet 4, that therefore begins to perform its own function of attracting the moving element 9.

Figure 2:
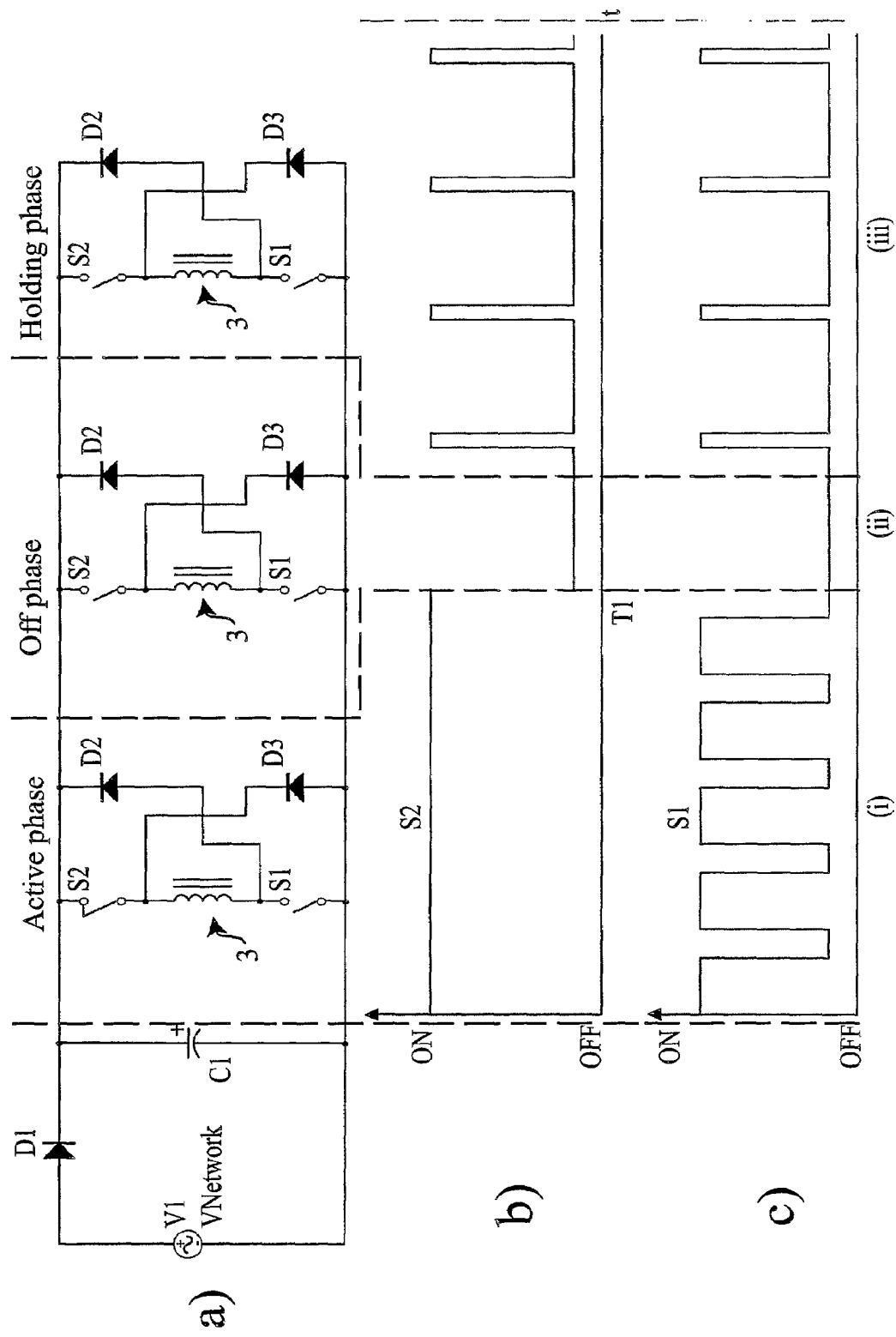
FIG. 2 shows a portion of the device of FIG. 1 and two control signals generated by the device of FIG. 1 in three different operating phases.

In particular, the first control logic 6 performs an innovative method for driving the primary winding 3 of the electromagnet 4, illustrated with reference to FIG. 2, where FIG. 2a shows a portion of the device of FIG. 1 in three different operation phases—indicated with (i), (ii), and (iii)—, and FIGS. 2b and 2c show voltages controlling switches S2 and S1, respectively, in the three operation phases.

In a first operation active phase, the electromagnet 4 must perform its function of attracting the moving element 9. In such phase, as shown in portion (i) of FIG. 2, the first control logic unit 6 closes the switch S2 for the whole time T1 necessary for traction. Moreover, it controls the switch S1 closing it at a predetermined (or variable) frequency with such an ON/OFF ratio both to make the current necessary for performing its own traction function flow in the primary winding 3 of the electromagnet 4, and to simultaneously operate as auto-transformer, for providing power supply to the first logic unit 6 through the shunt PP of the primary winding 3, and as transformer, for providing power supply to the second logic unit 7 through the secondary winding 5.

During this operation active phase, when the switch S1 opens, the discharge current flows through the diode D2, the switch S2, and the primary winding 3 of the electromagnet 4. In this way, the discharge circuit presents a low impedance so as to prevent the current from decreasing down to zero and, consequently, the electromagnet 4 from not performing its function of attracting the moving element 9. Moreover, the discharge circuit does not produce significant effects of thermal dissipation due to Joule effect.

In a second off phase, the moving element 9 must return back to its rest position outside the electromagnet 4. In this phase, as shown in portion (ii) of FIG. 2, the first control logic unit 6 simultaneously opens both switches S2 and S1, in the manner described in Italian Patent No. IT1315957, herein incorporated by reference. In this way, the off current is very fast and the residual energy accumulated in the capacitor C1 is recovered through diodes D2 and D3 in the electromagnet 4, which energy will be capable to be used in the successive phases. The energy recovered in this way does not produce thermal effects due to Joule effect.

In a third holding phase, the electromagnet 4 must not perform its traction function, but it must however ensure the power supply to the control logic units 6 and 7. In this phase, as shown in portion (iii) of FIG. 2, the first control logic 6 simultaneously closes the two switches S2 and S1 at a predetermined (or variable) frequency with such an ON/OFF ratio to make a current having a very low value flow in the primary winding 3 of the electromagnet 4, which current is not sufficient for traction, but it is sufficient for making the electromagnet operate as auto-transformer, for providing the power supply to the first logic unit 6 through the shunt PP of the primary winding 3, and as transformer, for providing the power supply to the second logic unit 7 through the secondary winding 5. In this holding phase, during opening of the switches S2 and S1, the residual energy accumulated during their closing is recovered in the capacitor C1 through the diodes D2 and D3. The energy recovered in this way is of capacitive nature and, consequently, it does not produce effects of thermal dissipation due to Joule effect.

The first control logic unit 6, by adjusting the ON/OFF ratio of the switches S1 and S2, is apt to make any electric current flow in the primary winding 3 of the electromagnet 4, so as to be capable to control its mechanical force. In particular, such ON/OFF ratio is equal to:

$$duty = k/Vin + q$$

where:

duty is the value of the duty cycle (i.e., the ratio between the time for which the switch is ON and the time for which the switch is OFF), k depends on the ratio between the input filtering capacitance and the magnet inductance, Vin is the working voltage, and q is the adaptation coefficient in relation to the capacity.

Therefore, by modulating the current, the driving device according to the invention is capable to excite the electromagnet 4 so that, during the movement of the moving element 9 with which it is provided, it may regulate in a continuous way the right force necessary for the required work. Such regulation solves the problem of traditional operation systems, wherein the current applied at the start-up has a value higher than necessary, being the current applied equal to a reference value valid for the electromagnet under steady conditions, which presents a higher resistive value of the primary winding. Such function may be adapted to all the electromagnets for any application.

By always modulating the current, it is possible to move the moving element 9 of the electromagnet 4 by a predetermined (or variable) amount, hence regulating its stroke. The first control logic unit 6, by measuring the current through the resistor R1, may further regulate the maximum capacity in kilograms that it is desired to obtain from the electromagnet, optimising its performances. The aforementioned regulations may be preferably carried out through the potentiometer P1 or through the second control logic unit 7.

The advantages offered by the driving device according to the invention are significant.

First of all, in the first active phase closing of the switch S2 and modulated opening of S1 allow to drive and suitably portion the magnet magnetisation and excitation current, reducing heat losses and greatly simplifying the off circuit.

Moreover, in both the first active phase and the third holding phase, the electromagnet is used as auto-transformer and possibly as transformer, thus allowing the circuit to auto-supply through the same electromagnet, in an electrically safe, since a double electric insulation is made, and inexpensive manner, since no power supply external circuits are used.

Still, the device is capable to operate in a reliable and accurate way over a wide range of supply voltages.

Furthermore, the device allows to maximise the transformation of electrical energy into mechanical force, avoiding inefficiencies.

Still, the device allows stored residual energy to be recovered.

The device further allows the current to be regulated so as to compensate thermal variations of the armature of the electromagnet during operation.

Furthermore, the device allows having a reduced scaling of the electromagnet, a higher efficiency, a lower energy consumption and the elimination of power supply circuits with a consequent reduction of costs.

The present invention has been described, by way of illustration and not by way of limitation, according its preferred embodiment, but it should be understood that those skilled in the art can make variations and/or changes, without so departing from the related scope of protection, as defined by the enclosed claims.

The invention claimed is:

1. A device for driving an electromagnet for operating pumps the electromagnet comprising a primary winding and a moving element that is attracted within the primary winding when an excitation current having a value higher than a threshold value flows in the primary winding, the device comprising:

power switching electronic means, a first control logic unit to control said power switching electronic means and to detect a value of said excitation current, and a power supply of the control logic unit provided by a corresponding shunt of the primary winding, wherein the control logic unit controls said power switching electronic means depending on the detected value of said excitation current to make the electromagnet operate as auto-transformer for sufficiently providing said power supply to the control logic unit and maintaining a function of attracting the moving element substantially unchanged.

2. The device according to claim 1, further comprising:

a rectifying bridge connected to a power supply, connected to a capacitor, and connected between a positive node and a circuit ground to provide on a power supply terminal a stabilized output voltage, a first power switch connected between an output terminal of the primary winding and the circuit ground, and controlled by the control logic unit, a second power switch connected between the power supply terminal and an input terminal of the primary winding, and controlled by the control logic unit, a diode connected between the output terminal of the primary winding and the positive node of the capacitor, and with such a polarity to allow current to flow from the output terminal to the positive node, and a further diode connected between the circuit ground and the input terminal of the primary winding, and with such a polarity to allow current to flow from the circuit ground to the input terminal, wherein the control logic unit controls the first and the second power switch, and detects the value of said excitation current, and the power supply necessary for the operation of the control logic unit is provided by the corresponding shunt of the primary winding.

3. The device according to claim 2, wherein in an operation active phase in which the electromagnet performs the function of attracting the moving element, the control logic unit keeps the second power switch closed and closes the first power switch at a first frequency with such an ON/OFF, closed/open ratio to make a variable excitation current higher than said threshold value flow in the primary winding.

4. The device according to claim 3, wherein in said operation active phase the control logic unit regulates said first frequency so as to regulate a stroke of the moving element.

5. The device according to claim 4, wherein the stroke of the moving element is adjustable through a regulation potentiometer connected to the control logic unit.

6. The device according to claim 2, wherein in a holding phase in which the electromagnet does not perform the function of attracting the moving element, the control logic unit simultaneously closes the first and the second power switches at a second frequency with such an ON/OFF ratio to make a variable excitation current lower than said threshold value flow in the primary winding.

7. The device according to claim 2, wherein in an off phase in which the moving element returns back in a rest position outside the electromagnet, the control logic unit simultaneously opens the first and the second power switches.

8. The device according to claim 1, wherein the control logic unit detects the value of said excitation current by measuring the voltage between the terminals of a resistor connected between the positive node and the power supply terminal.

9. The device according to claim 1, further comprising:
a further control logic unit to communicate with external devices through digital and/or analog signals, a power supply of the further control logic unit provided by a corresponding secondary winding of the electromagnet, the control logic unit controlling said power switching electronic means depending on the detected value of said excitation current to make the electromagnet also operate as an auto-transformer for sufficiently providing said power supply to the further control logic unit and maintaining the function of attracting the moving element substantially unchanged.

10. The device according to claim 9, wherein the further control logic unit further communicates with the first control logic unit through a galvanic insulation unit.

11. The device according to claim 4, further comprising:
a further control logic unit to communicate with external devices through digital and/or analog signals, a power supply of the further control logic unit provided by a corresponding secondary winding of the electromagnet, the first control logic unit controlling said power switching electronic means depending on the detected value of said excitation current to make the electromagnet also operate as an auto-transformer for sufficiently providing said power supply to the further control logic unit and maintaining the function of attracting the moving element substantially unchanged, the further control logic unit communicating with the first control logic unit through a galvanic insulation unit for regulating the stroke of the moving element.

12. A driven electromagnet for operating pumps, the electromagnet comprising:
a primary winding and a moving element that is attracted within the primary winding when an excitation current having a value higher than a threshold value flows in the primary winding,
a driving device, comprising the primary winding and the moving element that is attracted within the primary winding when the excitation current having a value higher than a threshold value flows in the primary winding, the driving device further comprising:
power switching electronic means,
a control logic unit to control said power switching electronic means and to detect the value of said excitation current, and
a power supply of the control logic unit provided by a corresponding shunt of the primary winding,
wherein the control logic unit controls said power switching electronic means depending on the detected value of said excitation current to make the electromagnet operate as auto-transformer for sufficiently providing said power supply to the control logic unit and maintaining the function of attracting the moving element substantially unchanged.

13. A method for driving an electromagnet for operating pumps, the electromagnet comprising a primary winding and a moving element that is attracted within the primary winding when an excitation current having value higher than a threshold value flows in the primary winding, the method comprising:
controlling power switching electronic means through a control logic unit depending on a detected value of said excitation current,
so as to make the electromagnet operate as auto-transformer for providing a power supply to the control logic unit through a corresponding shunt of the primary winding, and
maintaining the function of attracting the moving element substantially unchanged.

* * * * *